United States Patent
McElvain

(10) Patent No.: US 7,146,043 B2
(45) Date of Patent: Dec. 5, 2006

(54) METHOD FOR SMOOTH TRAP SUPPRESSION OF SMALL GRAPHICAL OBJECTS

(75) Inventor: Jon S. McElvain, Redondo Beach, CA (US)

(73) Assignee: Xerox Corporation, Stamford, CT (US)

( * ) Notice: Subject to any disclaimer, the term of this patent is extended or adjusted under 35 U.S.C. 154(b) by 841 days.

(21) Appl. No.: 10/411,505

(22) Filed: Apr. 10, 2003

(65) Prior Publication Data

US 2004/0202366 A1   Oct. 14, 2004

(51) Int. Cl.
G06K 9/00 (2006.01)
G06K 9/40 (2006.01)
G06T 5/00 (2006.01)
G03F 3/08 (2006.01)

(52) U.S. Cl. ............... 382/167; 382/275; 358/3.26; 358/518

(58) Field of Classification Search ........... 382/167, 382/266, 164, 275; 358/1.9, 3.26, 3.27, 540, 358/518, 523
See application file for complete search history.

(56) References Cited

U.S. PATENT DOCUMENTS

| | | | |
|---|---|---|---|
| 5,542,052 A * | 7/1996 | Deutsch et al. ............. 345/589 |
| 5,666,543 A * | 9/1997 | Gartland .................... 715/526 |
| 5,687,303 A | 11/1997 | Motamed et al. ........... 395/117 |
| 6,006,013 A | 12/1999 | Rumph et al. .............. 395/114 |
| 6,256,104 B1 | 7/2001 | Rumph et al. ............. 358/1.15 |
| 6,327,043 B1 | 12/2001 | Rumph et al. ............. 358/1.15 |
| 6,345,117 B1 | 2/2002 | Klassen .................... 382/167 |

* cited by examiner

Primary Examiner—Vikkram Bali
Assistant Examiner—Colin LaRose
(74) Attorney, Agent, or Firm—Jeannette Walder

(57) ABSTRACT

A method for smooth trapping of thin graphical objects, wherein a thin graphical object has a width dimension which is substantially less than the object's length dimension, includes receiving from a trap generator the location of a trap pixel that should be changed in color; determining the width of the object containing the trap pixel; comparing the width of the object with a trap threshold width; if the size of the object is less than the trap threshold width, reducing the width of the trap region according to a predetermined relationship; and applying a trap correction to the trap pixel according to the reduced trap width. The predetermined relationship may be a linear relationship which reduces the trap width monotonically for object widths less than the trap threshold width. The method may be applied to small objects and small font text objects.

6 Claims, 1 Drawing Sheet

METHOD FOR SMOOTH TRAP SUPPRESSION OF SMALL GRAPHICAL OBJECTS

CROSS REFERENCE TO RELATED APPLICATIONS

This invention is related to the inventor's application for "Method for Smooth Trap Suppression of Small Graphical Objects Using Run Length Encoded Data" which has been assigned to the assignee of this invention and which has been filed the same date as this application.

FIELD OF THE INVENTION

This invention relates generally to methods for correcting for marking engine characteristics, and more particularly, to a method smooth trapping suppression of small and thin graphical objects.

BACKGROUND OF THE INVENTION

Electronic processing of graphic and text images produces multi-color prints using multiple color separations. Typically, four process colors, cyan, magenta, yellow and black, are used to print multiple separations, which tend to have minor misregistration problems. The result of abutting or overlapping shapes is a boundary between adjacent regions of color that, under ideal printing conditions should have zero width. That is, one color should stop exactly where the abutting color begins, with no new colors being introduced along the boundary by the printing process itself. In practice, the realization of a zero width boundary between regions of different color is impossible as a result of small but visible misregistration problems from one printed separation to another. The error is manifested as a "light leak" or as a visible boundary region of an undesired color.

Methods for correcting for this misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone".

Trapping is a generally a two step process. The first step in the trapping process is to determine where there is an edge on which to apply trapping. Trapping is typically used between pixels that are not of identical color, but it can be used in other locations as well. The second step is to generate the overlay of one or more pixels, in any combination of the color separations, which is done by a "trap generator". The two inputs for the trap generator are the colors on both sides of the edge in question. For example, consider magenta and cyan, with a user-specified maximum trap width of two. The generator will compute from these whether trapping is necessary, what color to use, and where it should be applied. In this example, the correction could be zero (no trapping), one, or two pixels in width in any combination of cyan, magenta, yellow and black, and it could be located in either the magenta or cyan area. Edge detection and image manipulation to perform trapping may be done in any of several processes, including for example, the technique described in U.S. Pat. No. 6,345,117 to Victor Klassen, for "Method for Automatic Trap Selection for Correcting for Separation Misregistration in Color Printing".

For the typical trapping operation, it is assumed that objects to be trapped are very large relative to the trapping region, so that the trap colors will be difficult to distinguish. Thus, the color of only a thin boundary of the object will be changed, while the large internal area will have the original, correct color. However, for objects smaller than a few pixels, or for long, thin objects having a width less than a few pixels, trapping results in visible hue changes in the color of the entire object. For example, if a thin line is only two pixels in width, and the trap generator decides to change the color of those two pixels, the entire color of the thin line has been changed. Small objects, such as small font size text characters, may be printed in an entirely different color. If the thin line, or the small object, happens to be located near a larger object of the same initial color, there will be a visible hue shift relative to the larger object, and the result of the trapping operation will be less desirable than no trapping at all.

Existing trapping algorithms, such as those used by Scitex, specify an object or font size threshold below which trapping is disabled. This has the effect of eliminating the hue shift, but misregistration errors become visible once again. It would be desirable to reduce the hue shift of small and thin objects while preserving the continuity of traps.

SUMMARY OF THE INVENTION

The method of the invention can be used to reduce hue shifts in thin objects and small objects caused by trapping suppression in trap generators. A method for smooth trapping of a thin graphical object, according to one aspect of the invention, includes receiving from a trap generator the location of a trap pixel in a thin object that should be changed in color; wherein a thin graphical object has a width dimension which is substantially less than the object's length dimension, determining the width of the thin object containing the trap pixel; comparing the width of the thin object with a trap threshold width; if the width of the thin object is less than the trap threshold width, reducing the width of the trap region according to a predetermined relationship; and applying a trap correction to the trap pixel according to the reduced trap region width.

In one embodiment, the predetermined relationship may be a relationship which reduces the trap width monotonically. Instead of completely eliminating trapping for dimensions below a threshold, the method of the invention reduces the trap distance in a monotonic fashion (as the object size is reduced). As a result, the hue shift will be reduced, while preserving some degree of trapping at the edges to reduce visible misregistration errors.

In another embodiment, the predetermined relationship may be of the form $$t' = t_o f(w_t, w)$$

for $w < wt$, and $t' = to$ when $w \geq wt$, where $w$ is the width of the object, $w_t$ is the trap threshold width, $t_o$ is an original trap width as determined by the trap generator, $t'$ is the reduced trap width. In another embodiment, the function may be a linear relationship of the type $f(wt, w) = to(w/wt)$.

In accordance with another aspect of the invention, the method for smooth trapping may be applied to uniformly small objects, i.e., objects in which both dimensions (length and width) are less than the trap width threshold of a trap generator. A method for smooth trapping of a small object, includes receiving from a trap generator the location of a trap pixel in the small object that should be changed in color; wherein a small object has a size of the order of a few pixels;

determining a dimension of the small object containing the trap pixel; comparing the dimension of the small object with a trap threshold width; if the dimension of the object is less than the trap threshold width, reducing the width of the trap region according to a predetermined relationship; and applying a trap correction uniformly to the small object according to the reduced trap width.

An example of a small object includes small font size text objects. In accordance with another aspect of the invention, the method for smooth trapping may be used to provide smooth trapping for text objects. A text object is generally described by its font size and type. The method includes receiving from a trap generator the location of a trap pixel in the text object that should be changed in color; determining the font size of the text object containing the trap pixel; comparing the font size of the object with a font size threshold; if the font size of the object is less than the font size threshold, reducing the width of the trap region according to a predetermined relationship; and applying a trap correction uniformly to the text object according to the reduced trap width. The same predetermined relationships used with respect to thin objects may also be used with small objects and text objects.

DETAILED DESCRIPTION OF THE PREFERRED EMBODIMENTS

Figure 1:
FIG. 1 illustrates hue shift at the edges of a thin object compared to a thicker object.

One aspect of the method for smooth trap suppression of thin objects according to the invention involves determining how much to trap based on the size of the incoming page objects. Consider two different trapping scenarios, a thick and thin red line, as depicted in FIG. 1. In this example, most trap engines will reduce the yellow content at the edges of both objects to produce an optimal misregistration correction, resulting in a magenta-cast trap. If this trap is applied to the thicker line, the edge hue shift is almost imperceptible relative to the body of the line. However, the thin line below it shows a noticeable hue shift along the edge, since in that case the trap comprises a large fraction of the line area.

Many trapping algorithms completely disable trapping for objects whose dimensions fall below a specified trap width threshold. A drawback to this approach is the return of any misregistration errors that trapping would have reduced. The method of the invention reduces the trap width for objects that fall below a trap width threshold, rather than complete elimination of trapping. This can reduce the overall hue shift associated with small object trapping, while preserving some of the misregistration correction trapping provides.

A thin graphical object is generally one in which the width is substantially less than its length (as can be seen, for example, in the thin line of FIG. 1). Assuming that a particular trap generator has a predetermined trap width threshold (below which trapping is disabled), the method of the invention determines the width of the object for which trapping is selected. If the width of the object is less than the trap width threshold of the trap generator, the method of the invention determines a trap correction. The trap correction reduces the trap width according to a predetermined relationship. Trap pixels are then applied to the reduced trap area.

Figure 2:
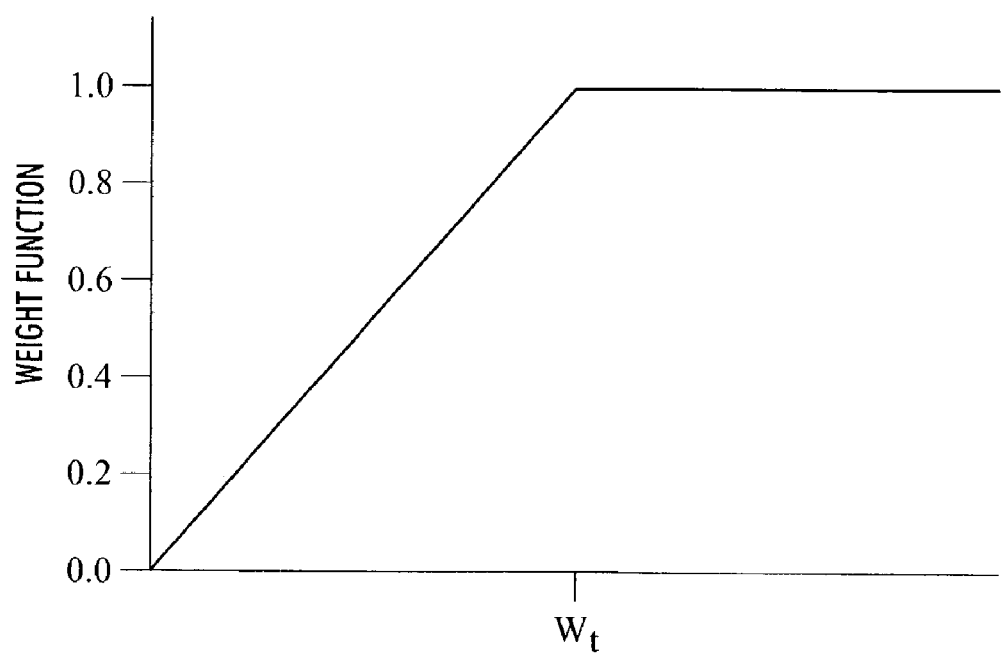
FIG. 2 is a graph of an exemplary weighting function for determining trap size.

Various predetermined relationships may be used. The predetermined relationship may be a monotonically increasing function of the object size, and is dependent on the threshold itself. For example, a function of the type may be used:

$$t' = t_o f(w_t, w)$$

for w<wt and t'=to when w≧wt, where w is the width of the object, t' is the reduced trap width, $t_o$ is the original trap width as determined by the trap generator, and $w_t$ is the threshold width as determined by the trap generator. Weighting function $f$ is generally unity above the threshold, and an increasing function of w below the threshold. An example weighting function $f$ that is monotonically increasing up to the threshold, and unity thereafter is shown in FIG. 2. The weighting function in FIG. 2 can be a linear function of the form f(wt, w)=to(w/wt).

Other weighting functions may also be applied. For example, a quadratic function which increases as w approaches wt may be used. Higher order, monotonically increasing functions may also be used. Any function which meets the requirements of monotonically increasing with object size and f=1 when the object dimensions are greater than or equal to the threshold width determined by the trap generator may be used.

The method for smooth trapping may be applied to small objects, i.e., objects in which both dimensions (length and width) are less than the trap threshold width of a trap generator (or objects of only a few pixels). A dimension of the small object is determined and compared with the trap threshold width. If the object's dimension is less than the trap threshold width, a predetermined relationship (such as one of those described above with respect to thin objects) is used to reduce the trap region. Then trapping is applied uniformly to the entire small object using the reduced trap width.

The method of the invention can be used for font size discrimination, where the reduced trap width would be applied uniformly to the font. Text objects are generally defined by their font size. If a text character is one color and it is positioned on top of a different colored background (or plain paper), misregistration errors may appear as a shadowing effect. For very small font sizes, many trap generators would simply turn off the trap process. The method of the invention can be applied to reduce the trap width based on a predetermined relationship and apply the trap pixels uniformly to the text characters.

The result of this "smooth" thin (and small) object trapping discrimination is a significant reduction of small object hue shifts, as well as a preservation of trapping continuity at object edges. For example, for a trap generator with a trap threshold of 10 pixels (wt) and a trap radius of 3 pixels (to), an object of width 7 pixels (w) might have a corrected trap radius of 2 pixels (t').

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for smooth trapping of a thin graphical object, comprising:

receiving from a trap generator the location of a trap pixel in the thin graphical object that should be changed in color;

wherein the thin graphical object has a width dimension which is substantially less than the object's length dimension, determining the width of the thin graphical object containing the trap pixel;

comparing the width of the thin graphical object with a trap threshold width;

if the width of the thin graphical object is less than the trap threshold width, reducing the width of a trap region according to a predetermined relationship; and applying a trap correction to the trap pixel according to the reduced trap region width.

2. The method of claim 1, wherein the predetermined relationship comprises a relationship which reduces the trap region width monotonically.

3. The method of claim 1, wherein the predetermined relationship comprises:

$t'=t_o f(w_t,w)$ for $w<w_t$, and $t'=t_o$ when $\geq w_t$, where w is the width of the thin graphical object, $w_t$ is the trap threshold width, $t_o$ is an original trap region width as determined by the trap generator and t' is the reduced trap region width.

4. The method of claim 3, wherein $f(w_t, w) = t_o(w/w_t)$.

5. A method for smooth trapping of a small object, comprising:

receiving from a trap generator the location of a trap pixel in the small object that should be changed in color;

wherein the small object has a size of the order of a few pixels;

determining a dimension of the small object containing the trap pixel;

comparing the dimension of the small object with a trap threshold width;

if the dimension of the small object is less than the trap threshold width, reducing the width of a trap region according to a predetermined relationship; and applying a trap correction uniformly to the small object according to the reduced trap width.

6. A method for smooth trapping of a text object, comprising:

receiving from a trap generator the location of a trap pixel in the text object that should be changed in color;

wherein the text object has a font size;

determining the font size of the text object containing the trap pixel;

comparing the font size of the object with a font size threshold; reducing the width of if the font size of the text object is less than the font size threshold, reducing the width of a trap region according to a predetermined relationship; and applying a trap correction uniformly to the text object according to the reduced trap width.

* * * * *